(12) United States Patent
Yu et al.

(10) Patent No.: US 9,921,991 B2
(45) Date of Patent: Mar. 20, 2018

(54) SYSTEMS AND METHODS FOR FLIPPING NIC TEAMING CONFIGURATION WITHOUT INTERFERING LIVE TRAFFIC

(71) Applicant: Nicira, Inc., Palo Alto, CA (US)

(72) Inventors: Jia Yu, Sunnyvale, CA (US); Ronghua Zhang, San Jose, CA (US)

(73) Assignee: NICIRA, INC., Palo Alto, CA (US)

(*) Notice: Subject to any disclaimer, the term of this patent is extended or adjusted under 35 U.S.C. 154(b) by 287 days.

(21) Appl. No.: 14/950,980

(22) Filed: Nov. 24, 2015

(65) Prior Publication Data

US 2017/0147522 A1 May 25, 2017

(51) Int. Cl.
G06F 13/40 (2006.01)
G06F 13/362 (2006.01)
G06F 13/38 (2006.01)
H04L 12/24 (2006.01)

(52) U.S. Cl.
CPC ........ G06F 13/4022 (2013.01); G06F 13/362 (2013.01); G06F 13/385 (2013.01); H04L 41/0859 (2013.01)

(58) Field of Classification Search
CPC ... G06F 13/4022; G06F 13/385; G06F 13/387
USPC ........................................................ 710/316
See application file for complete search history.

(56) References Cited

U.S. PATENT DOCUMENTS

| | | | | |
|---|---|---|---|---|
| 7,639,624 | B2* | 12/2009 | McGee | H04L 29/12009 370/245 |
| 8,040,903 | B2* | 10/2011 | McGee | H04L 41/082 370/390 |
| 8,386,762 | B2* | 2/2013 | Lee | G06F 9/4416 370/409 |
| 8,984,140 | B2* | 3/2015 | Modi | H04L 29/12009 709/226 |
| 9,491,084 | B2* | 11/2016 | McGee | H04L 43/0811 |
| 9,680,772 | B2* | 6/2017 | Kothari | H04L 49/70 |
| 9,727,386 | B2* | 8/2017 | Lu | G06F 9/5077 |
| 2014/0108584 | A1* | 4/2014 | Lu | H04L 47/76 709/208 |
| 2014/0258479 | A1* | 9/2014 | Tenginakai | H04L 41/082 709/220 |
| 2015/0074661 | A1* | 3/2015 | Kothari | H04L 49/70 718/1 |
| 2016/0077935 | A1* | 3/2016 | Zheng | G06F 11/2028 714/4.12 |

* cited by examiner

*Primary Examiner* — Brian T Misiura
(74) *Attorney, Agent, or Firm* — Adeli LLP

(57) ABSTRACT

Systems and methods described herein facilitate configuration changes to an NIC teaming device while enabling multiple I/O threads continue to run through the NIC teaming device concurrently without interruption. At a given time, multiple configurations of the NIC teaming device, e.g., one for a current configuration of the NIC teaming device and one for a new configuration of the NIC teaming device, can co-exist. For the duration of one iteration, the current configuration of the NIC teaming device used by a specific I/O thread does not change and the new configuration of the NIC teaming device is not adopted by the I/O thread until the start of the next iteration. Once all of the I/O threads finish their current iteration, the configuration of the NIC teaming device is flipped from the current configuration to the new configuration and the current configuration is deleted.

20 Claims, 3 Drawing Sheets

SYSTEMS AND METHODS FOR FLIPPING NIC TEAMING CONFIGURATION WITHOUT INTERFERING LIVE TRAFFIC

BACKGROUND

A virtual (software) switch or host switch is a software component running on a host with links to one or more physical network interface controllers (pNICs) coupled to physical switches to provide network connectivity for I/O threads of applications running on the host. To provide link redundancy and bandwidth aggregation, NIC teaming, which includes and presents a plurality of pNICs as one virtual NIC teaming device to the I/O threads, has been used by the physical switches, operating systems, and hypervisors for many years. Here, NIC teaming configuration includes but is not limited to membership (e.g., which pNICs belong to the NIC team), load balancing (e.g., L2-L4 header based hashing, explicit fail-over, etc.), and protocol specifics (e.g., timeout threshold in Link Aggregation Control Protocol (LACP) state machine). These NIC teaming configuration can be changed anytime by users through a cluster management server.

Currently, when an NIC teaming device is up and running, changing its configuration requires holding a lock on the device, and the I/O threads that receive and transmit packets through the NIC teaming device need to check and acquire the lock. Specifically, changing the configuration of the NIC teaming device and handling activities of the I/O threads through the NIC teaming device are mutually exclusive—if the configuration of the NIC teaming device is changing, the I/O threads are blocked by the lock on the NIC teaming device until changes to its configuration is done; If the I/O threads are using the NIC teaming device, configuration thread to the NIC teaming device is blocked until the I/O threads relinquish the lock so the configuration thread can acquire the lock on the NIC teaming device. As such, the I/O threads need to acquire/release lock for every batch processing of the packets, even though changes to the configuration of the NIC teaming device happen very infrequently.

A BSD project called "Data Plane Development Kit" (DPDK) provides a set of libraries and procedures for fast packet processing. With DPDK and similar technologies, the pNIC drivers run in a polling mode (not excluding the possibility of a pushing mode, which is interrupt based), where I/O threads of the applications running on the host execute a run-to-complementation dispatch loop that cycles/iterates continuously through processing tasks (e.g., receiving, processing, and transmitting the packets to/from the pNICs) of a batch of packets during each iteration on multiple cores of the host concurrently. For high performance network processing, letting the applications acquire/release lock on the NIC teaming device to synchronize changes to its configuration is expensive.

SUMMARY

Systems and methods described herein facilitate configuration changes to an NIC teaming device while enabling multiple I/O threads continue to run through the NIC teaming device concurrently without the need of synchronization and locking on the NIC teaming device. At a given time, multiple configurations of the NIC teaming device, e.g., one for a current configuration of the NIC teaming device and one for a new configuration of the NIC teaming device, can co-exist. For the duration of one iteration, the current configuration of the NIC teaming device used by a specific I/O thread does not change and the new configuration of the NIC teaming device is not adopted by the I/O thread until the start of the next iteration. Since different I/O threads may run at different speeds, both the current and new configurations of the NIC teaming device can be used by the I/O threads at the same time. Once all of the I/O threads finish their current iteration, the configuration of the NIC teaming device is flipped from the current configuration to the new configuration and the current configuration is deleted.

DETAILED DESCRIPTION

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
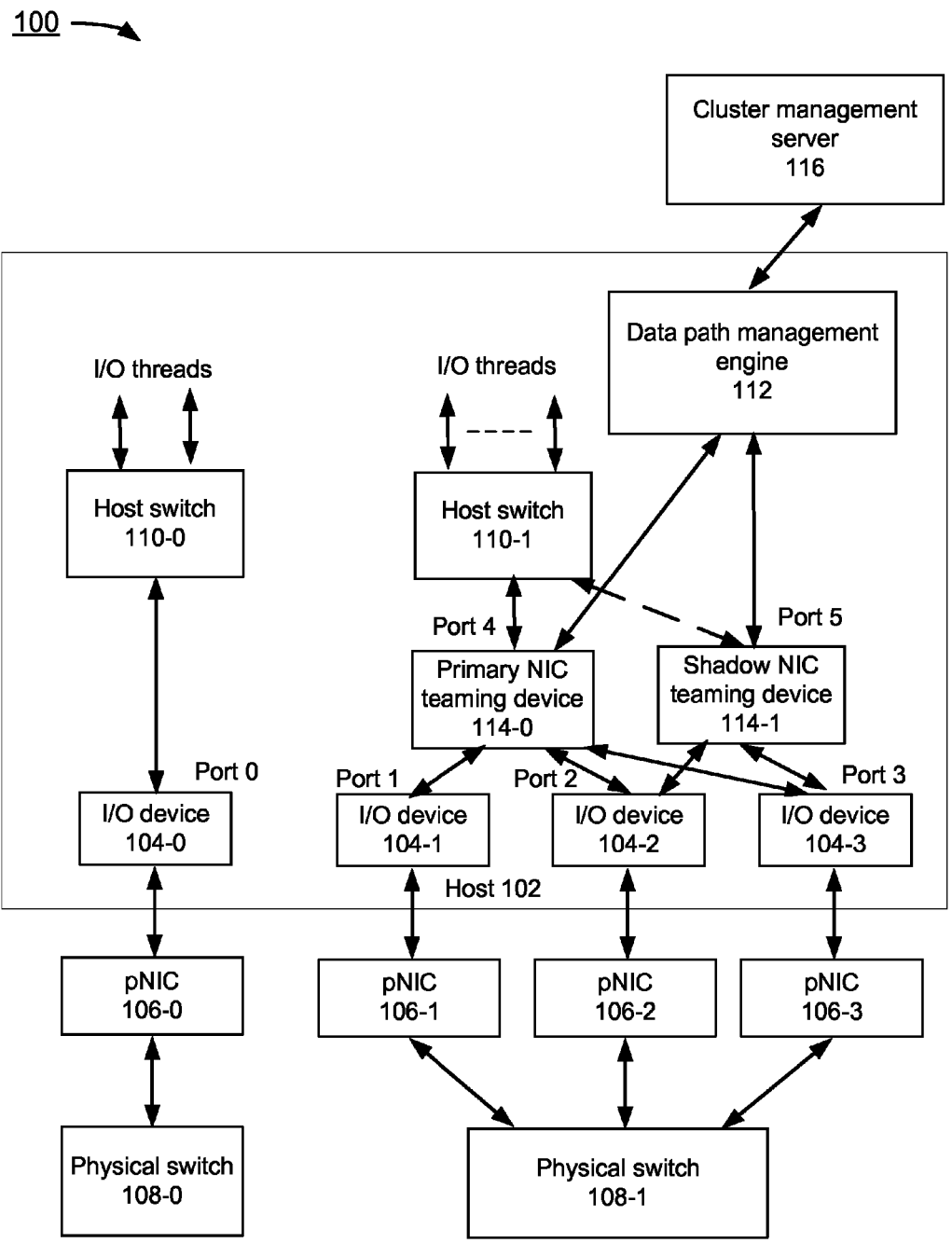
FIG. 1 shows an example of a system diagram to support NIC teaming configuration flipping without interfering live traffic in accordance with some embodiments.

FIG. 1 shows an example of a system diagram to support NIC teaming configuration flipping without interfering live traffic. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a data path management engine 112 and a plurality of NIC teaming devices 114 running on a host 102. As used herein, each of the data path management engine 112 and the NIC teaming devices 114 refers to software, firmware, hardware, or other component that is used to effectuate a purpose. Each will typically include software instructions that are stored in non-volatile memory (also referred to as secondary memory) for practicing one or more processes. When the software instructions are executed, at least a subset of the software instructions is loaded into memory (also referred to as primary memory) by one of the computing units/cores of the host 102, which becomes a special purposed one for practicing the processes. The processes may also be at least partially embodied in the computing unit into which computer program code is loaded and/or executed, such that, the computing unit becomes a special purpose computing unit for practicing the processes.

In some embodiments, the host 102 may include a multi-core processing unit, wherein each of a plurality of cores (not shown) is an execution unit configured to support one of the I/O threads of the applications running on the host 102. The host 102 may also include a plurality of I/O devices 104, which are physical network/Ethernet ports of the host 102 serving as input/output interfaces coupled to a plurality of pNICs 106 that connect to one or more physical switches 108 for forwarding packets of the I/O threads over a network. Here, each of the I/O devices 104 may provide a software interface (e.g., :rte_eth_dev in DPDK, or net_device in Linux) between software-based protocols and one of the hardware pNICs 106, which stores all information specifically regarding the network device. Here, the host 102 can be a computing device, a communication device, a storage device, or any electronic device capable of running a software component. For non-limiting examples, a computing device can be but is not limited to a laptop PC, a desktop PC, a tablet PC, or a server running Linux or other operating systems.

In the example of FIG. 1, a plurality of host switches 110 run on the host 102, wherein each of the virtual switches is a software component that assigns a plurality of I/O threads of the applications running on the host 102 to the plurality of pNICs 106 coupled to the physical switches 108 through the I/O devices 104 of the host 102, wherein each of the I/O devices 104-0 to 104-3 has a designated port number, e.g., Port 0, ..., Port 3. In some embodiments, a virtual switch, e.g., 110-0, is configured to interact with an I/O device, e.g., 104-0, directly for communication with a pNIC, e.g., 106-0. Here, the virtual switches 110 are virtual switches—i.e., software components that provide the function of Layer 2 physical network switches. That is, virtual switches are capable of forwarding network packets between ports associated with the virtual switch. Each port is a software interface, such as a message queue, with the virtual switch and may be associated using a forwarding table (not shown) maintained by the virtual switch with attached endpoint addresses, such as MAC addresses, in the same fashion as a physical Layer 2 network switch. Some ports are "uplink" ports and are connected to physical NICs such as pNICs 106, while other ports (not shown) may be connected via virtual NICs (software implementations of a NIC, not shown) to virtual machines (not shown), namespace containers (not shown), applications (not shown), or other communication endpoints within host 102.

In some embodiments, a virtual switch, e.g., 110-1, is configured to interact with a plurality of pNICs, e.g., 106-1 to 106-3, through a primary NIC teaming device, e.g., 114-0, which maps to a plurality of I/O devices 104-1 to 104-3 that are coupled to the pNICs 106-1 to 106-3. In some embodiments, the pNICs 106-1 to 106-3 are further connected to ports of the same physical switch 108-1. In some alternative embodiments, the pNICs may connect to ports of a plurality of separate but interlinked physical switches (e.g., those supporting M-LAG) to form a single logical connection through primary NIC teaming device 114-0. The primary NIC teaming device 114-0 is a virtual software device configured to present the plurality of I/O devices 104-1 to 104-3 to the virtual switch 110-1 as one single/virtual I/O device having the same interface as a physical I/O device (e.g., 104-0) to a pNIC. To the I/O threads of the applications running on the host 102, the primary NIC teaming device 114-0 works same as an individual I/O device to the pNICs. The configuration of the primary NIC teaming device 114-0, e.g., physical I/O devices and pNICs included, is made transparent to the users or I/O threads of the virtual switch 110-1. Here, the configuration of the primary NIC teaming device 114-0 includes but is not limited to membership, i.e., which pNICs 106 (through their corresponding I/O devices 104) belong to the primary NIC teaming device 114-0, load balancing among its member pNICs 106, and protocol specifications of its member pNICs 106.

Figure 2:
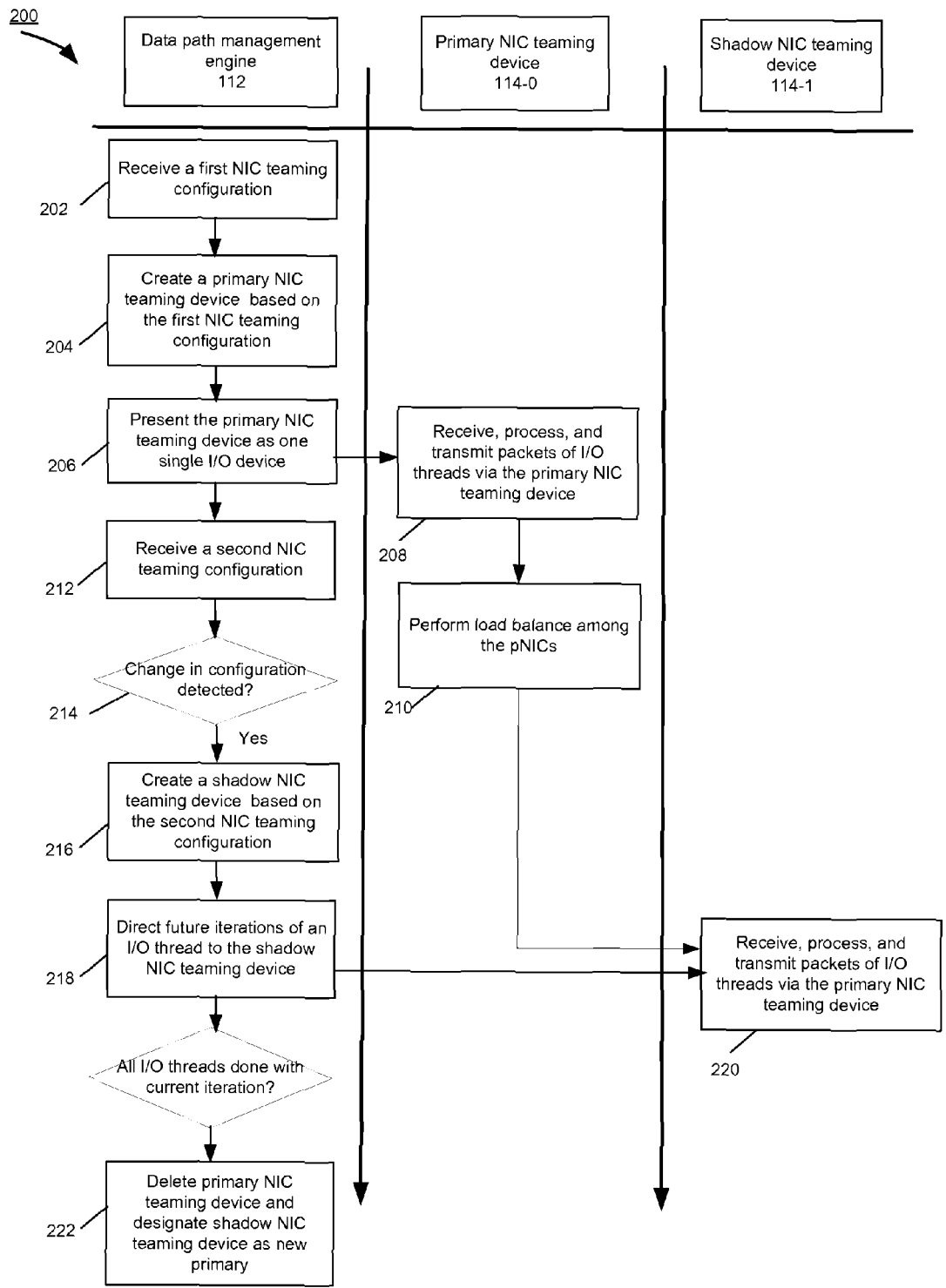
FIG. 2 is a swimlane diagram of an exemplary method to support NIC teaming configuration flipping without interfering live traffic in accordance with some embodiments.

FIG. 2 is a swimlane diagram 200 of an exemplary method to support NIC teaming configuration flipping without interfering live traffic. This method may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

When the host 102 is rebooted/restarted, the plurality of its I/O devices 104 that are coupled to the corresponding pNICs 106 are detected and provided to a cluster management server (such as VMWare's NSX) 116 over a network, wherein the cluster management server 116 is responsible for the management and confirmation of network devices in the system including the pNICs 106. In operation 202, the data path management engine 112 running on the host 102 is configured to receive a first NIC teaming configuration pushed from the cluster management server 116 over the network. In operation 204, the data path management engine 112 is configured to create the primary NIC teaming device 114-0 and map it to a plurality or team of I/O devices 104-1 to 104-3 coupled to pNICs 106-1 to 106-3, respectively, based on the first NIC teaming configuration received. Once created, the primary NIC teaming device 114-0 is presented to the virtual switch 110-1 as one single I/O device with a designated port number, e.g., Port 4, in operation 206, and the primary NIC teaming device 114-0 is utilized by the virtual switch 110-1 to receive, process, and transmit packets from the I/O threads of the applications running on the host 102 through its member pNICs 106 in operation 208.

In some embodiments, packets from multiple I/O threads are processed by the same primary NIC teaming device 114-0, wherein the I/O threads may run on different cores of the host 102 at different speeds. In operation 210, the primary NIC teaming device 114-0 is configured to perform load balancing among the pNICs 106. Here, load balancing schemes that may be adopted by the primary NIC teaming device 114-0 include but are not limited to, routing based on the originating port where the traffic entered the primary NIC teaming device 114-0, routing based on a hash of the source and destination IP addresses of each packet, route based on a hash of the source MAC, routing based on the current load of the pNICs 106 connected to the primary NIC teaming device 114-0, and using explicit failover order to adopt the highest order uplink from the pNICs 106 which passes failover detection criteria.

In some embodiments, the primary NIC teaming device 114-0 is configured to perform load balancing among the pNICs 106 by assigning different of its member I/O devices 104 coupled to the pNICs 106 to process packets in different queues 118 based on the current load on the pNICs 106. For the non-limiting example depicted in FIG. 3, pNICs 106-1 and 106-2 are assigned by the primary NIC teaming device 114-0 to queue 118-0 through their respective I/O devices 104-1 and 104-2, while pNICs 106-2 and 106-3 are assigned to queue 118-1 through their respective I/O devices 104-2 and 104-3 based on the current load of the pNICs 106-1 to 106-3.

During the operation of the primary NIC teaming device 114-0 (e.g., where it is processing packets from the I/O threads of the applications running on the host 102), a user-specified new/second NIC teaming configuration for the plurality of its I/O devices 104 may be pushed by the cluster management server 116 and received by the data path management engine 112 in operation 212: In operation 214, the data path management engine 112 is then configured to compare the new NIC teaming configuration with the first NIC teaming configuration previously received from the cluster management server 116 (and used to setup the current configuration of the pNICs 106) to identify the changes and modifications in the configuration. Here the changes include but are not limited to, change in the members of the NIC teaming device, e.g., adding or removing a member from the NIC teaming device, and load balancing among the pNICs 106.

If changes to the membership of the primary NIC teaming device 114-0 are detected, instead of applying a lock on the primary NIC teaming device 114-0 to block the changes to its configuration, the data path management engine 112 is configured in operation 216 to create a shadow NIC teaming device 114-1 to reflect the latest changes in the members of the NIC teaming device. In some embodiments, the newly created shadow NIC teaming device 114-1 shares same device name as the primary NIC teaming device 114-0 but with a different portID (Port 5 vs. Port 4), wherein the device name is used as a public ID for the I/O threads to access the physical resources (e.g., the team of pNICs 106). However, the shadow NIC teaming device 114-1 may has a different configuration/team of pNICs 106 from the primary NIC teaming device 114-0 with possible overlapping in their respective memberships. For the example depicted in FIG. 1, the primary NIC teaming device 114-0 has I/O devices 104-1 to 104-3 as its members, which are coupled to external pNICs 106-1 to 106-3, respectively. The shadow NIC teaming device 114-1, on the other hand, has only I/O devices 104-2 and 104-3 as its members according to the second NIC teaming configuration from the cluster management server 116. As such, I/O devices 104-2 and 104-3 are included in both the primary NIC teaming device 114-0 and the shadow NIC teaming device 114-1.

After the shadow NIC teaming device 114-1 has been created, each of the I/O threads that mainly receives packets from the primary NIC teaming device 114-0, process the packets, and transmit packets through the primary NIC teaming device 114-0 will continue to do so until the end of the current iteration of handling (receiving, processing, and transmitting) the current batch of packets in the queues for the I/O threads as discussed below. Since the I/O threads may run on different cores/processors of the host 102 at different speed, some faster than others, they may finish their current iteration at different times. Once an I/O thread is done with its current iteration, the data path management engine 112 is configured to direct future iterations of the I/O thread to the newly created the shadow NIC teaming device 114-1 in operation 218 via an atomic operation. Specifically, when the I/O threads looks up the NIC teaming device by its device name at the beginning of a new iteration, the data path management engine 112 simply flips a NIC teaming device pointer from the primary NIC teaming device 114-0 to the shadow NIC teaming device 114-1. The shadow NIC teaming device 114-1 is then configured to receive, process, and transmit packets from the I/O thread during in place of the primary NIC teaming device 114-0 during future iterations in operation 220. Here, the shadow NIC teaming device 114-1 is configured to perform various functions (e.g., load balancing) as the primary NIC teaming device 114-0 described above. As such, two NIC teaming devices have different configurations, the primary NIC teaming device 114-0 and the shadow NIC teaming device 114-1, may exist and run at the same time and each I/O thread may receive/transmit packets via one of the NIC teaming devices 114-0 and 114-1, but not both, at any time.

Figure 3:
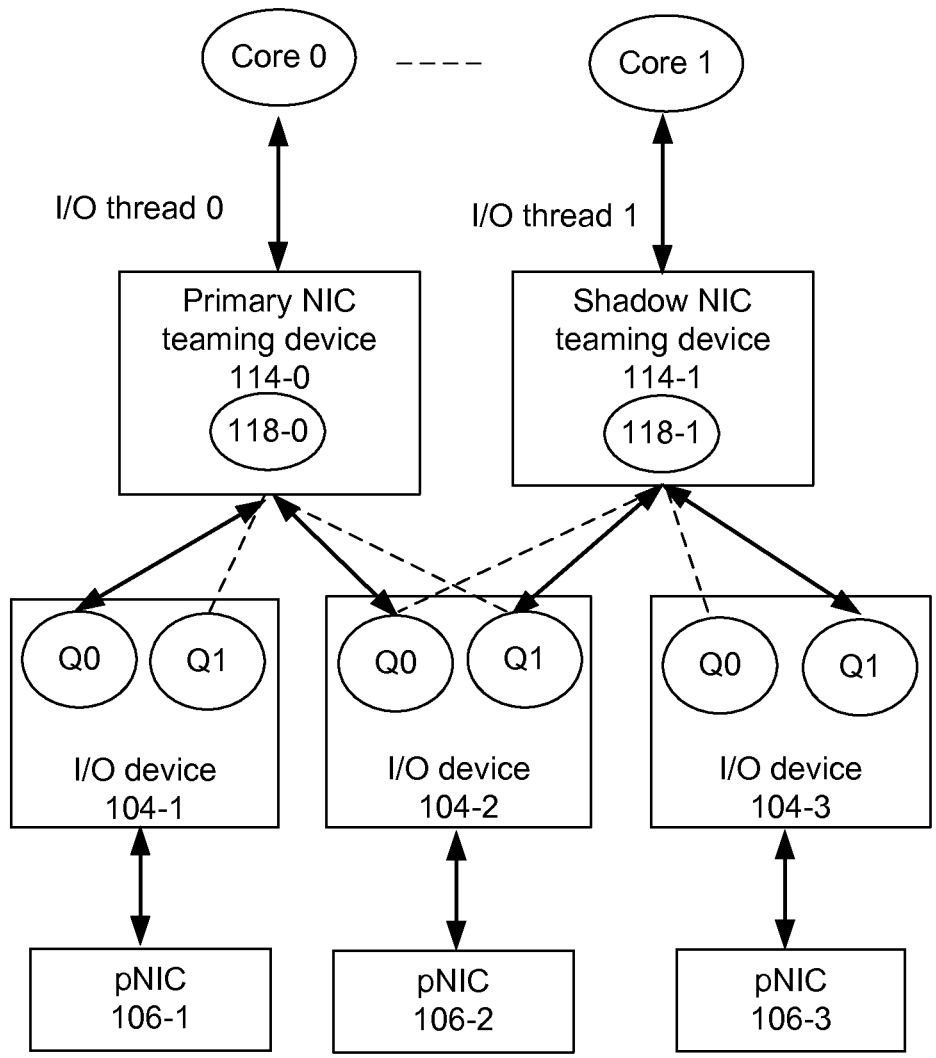
FIG. 3 depicts an example of a plurality queues each corresponding to packets to and/or from one of the I/O threads handled by an NIC teaming device in accordance with some embodiments.

In some embodiments, the NIC teaming device 114-0 is configured to establish and maintain one queue 118 for each of the cores and I/O threads handled by the same NIC teaming device 114 as shown in FIG. 3, wherein the queue 118 is mapped to queues for each of the cores on the I/O devices 104 of the NIC teaming device 114 (assuming each I/O device allocates one tx queue for each CPU core). For the non-limiting example shown in FIG. 3, when a first I/O thread e.g., I/O thread 0 pinned to CPU/core 0, transmits packets using the first NIC teaming configuration (e.g., pNIC 106-1 and 106-2), it calls into queue 118-0 on the primary NIC teaming device 114-0, wherein queue 118-0 maps to the tx queues for the core 0 (e.g., Q0s) on I/O devices 104-1 and 104-2, respectively. When a second I/O thread, e.g., I/O thread 1 pinned to CPU/core 1, flips to the second NIC teaming configuration (e.g., pNIC 106-2 and 106-3), it calls into queue 118-1 on the shadow NIC teaming device 114-1, wherein queue 118-1 maps to the tx queues for the core 1 (e.g., Q1s) on I/O devices 104-2 and 104-3, respectively (the dotted lines in FIG. 3 show un-used mapping during the flipping). Under such (I/O thread—CPU core—I/O device queue) assignment, the I/O thread 0 and 1 access the two different NIC teaming devices 114-0 and 114-1 having different configurations concurrently at different queues (Q0 and Q1) of the I/O devices, respectively. Due to the one-to-one mapping between the cores and the queues on the I/O devices and the one-to-one pinning between the cores and the I/O threads, traffic/packets flowing from the I/O threads do not contend with each other during the flipping and neither of the I/O threads is interrupted or conflicted during the period when both NIC teaming devices exist.

After all of the I/O threads handled by the primary NIC teaming device 114-0 are done with their current iteration of handling the batch of packets in the queues for the I/O threads and no failure has happened in other components of the host 102, which would require a configuration rollback, the I/O threads should all have flipped to the shadow NIC teaming device 114-1 for their future iterations of processing. At this point, the current primary NIC teaming device 114-0 can be deleted to free up the resources it occupies and the data path management engine 112 is configured to designate the shadow NIC teaming device 114-1 as the new primary NIC teaming device for the I/O threads in operation 222. On the other hand, if changes in the NIC teaming configuration needs to be rolled back due to a failure, the data path management engine 112 is configured to delete the shadow NIC teaming device 114-1, and direct all of the I/O threads will continue to use the original primary NIC teaming device 114-0.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A host to support network interface controller (NIC) configuration flipping without interfering live traffic, the host comprising:
a processing unit configured to:
create a primary NIC teaming device on the host based on a first NIC teaming configuration, wherein the primary NIC teaming device maps to a plurality of physical I/O devices that are coupled to a plurality of external physical NICs, wherein the primary NIC teaming device is configured to
present the plurality of physical I/O devices as one virtual I/O device to a plurality of I/O threads of applications running on the host;
receive, process, and transmit packets from the I/O threads via the primary NIC teaming device through a plurality of iterations;
create a shadow NIC teaming device on the host based on a second NIC teaming configuration that is different from the first NIC teaming configuration while allowing the primary NIC teaming device to continue to handle the packets from the I/O threads;
direct future iterations of one of the I/O threads to the shadow NIC teaming device when the I/O thread is done with its current iteration with the primary NIC teaming device, wherein the shadow NIC teaming device is configured to handle the packets of the I/O threads in the future iterations;
delete the primary NIC teaming device and designate the shadow NIC teaming device as the new primary NIC teaming device when all of the I/O threads are done with their current iteration with the primary NIC teaming device.

2. The host of claim 1, wherein:
the host includes a plurality of cores, wherein each core is an execution unit configured to support one of the I/O threads of the applications running on the host.

3. The host of claim 1, wherein:
the first and/or the second NIC teaming configuration includes one or more of which pNICs belong to the primary NIC teaming device or the shadow NIC teaming device through their corresponding I/O devices, load balancing among the pNICs, and protocol specifications of the pNICs.

4. The host of claim 3, wherein:
the shadow NIC teaming device maps to a plurality of physical I/O devices coupled to a plurality of external physical NICs that are not identical to the physical I/O devices of the primary NIC teaming device.

5. The host of claim 1, wherein:
the shadow NIC teaming device shares same device name as the primary NIC teaming device but with a different port ID.

6. The host of claim 1, wherein:
a data path management engine is configured to direct the future iterations of the I/O thread to the shadow NIC teaming device via an atomic operation by swapping pointer to the NIC teaming device from the primary NIC teaming device to the shadow NIC teaming device.

7. The host of claim 1, wherein:
each of the I/O threads is configured to access one of the primary NIC teaming device and the shadow NIC teaming device, but not both, at any time.

8. The host of claim 1, wherein:
a data path management engine is configured to delete the shadow NIC teaming device and direct all of the I/O threads to continue to use the primary NIC teaming device if NIC teaming configuration rollback is required due to a failure.

9. A method to support network interface controller (NIC) configuration flipping without interfering live traffic, comprising:
creating a primary NIC teaming device on a host based on a first NIC teaming configuration by a user, wherein the primary NIC teaming device maps to a plurality of physical I/O devices that are coupled to a plurality of external physical NICs;
creating a shadow NIC teaming device on the host based on a second NIC teaming configuration that is different from the first NIC teaming configuration while allowing the primary NIC teaming device to continue to handle the packets from the I/O threads;
directing future iterations of one of a plurality of I/O threads to the shadow NIC teaming device when the I/O thread is done with its current iteration with the primary NIC teaming device, wherein the shadow NIC teaming device is configured to handle the packets of the I/O threads in the future iterations;
deleting the primary NIC teaming device and designating the shadow NIC teaming device as the new primary NIC teaming device when all of the I/O threads are done with their current iteration with the primary NIC teaming device.

10. The method of claim 9, further comprising:
presenting the plurality of physical I/O devices as one virtual I/O device to the plurality of I/O threads of applications running on the host;
receiving, processing, and transmitting packets from the I/O threads via the primary NIC teaming device and/or the shadow NIC teaming device through a plurality of iterations.

11. The method of claim 9, further comprising:
mapping the shadow NIC teaming device to a plurality of physical I/O devices coupled to a plurality of external physical NICs that are not identical to the physical I/O devices of the primary NIC teaming device.

12. The method of claim 9, further comprising:
directing the future iterations of the I/O thread to the shadow NIC teaming device via an atomic operation by swapping pointer to the NIC teaming device from the primary NIC teaming device to the shadow NIC teaming device.

13. The method of claim 9, further comprising:
allowing each of the I/O threads is configured to access one of the primary NIC teaming device and the shadow NIC teaming device, but not both, at any time.

14. The method of claim 9, further comprising:
deleting the shadow NIC teaming device and direct all of the I/O threads to continue to use the primary NIC teaming device if NIC teaming configuration rollback is required due to a failure.

15. At least one non-transitory computer-readable storage medium having computer-executable instructions embodied thereon, wherein, when executed by at least one processor, the computer-executable instructions cause the at least one processor to:
create a primary NIC teaming device on a host based on a first NIC teaming configuration by a user, wherein the primary NIC teaming device maps to a plurality of physical I/O devices that are coupled to a plurality of external physical NICs;
create a shadow NIC teaming device on the host based on a second NIC teaming configuration that is different from the first NIC teaming configuration while allowing the primary NIC teaming device to continue to handle the packets from the I/O threads;
direct future iterations of one of a plurality of I/O threads to the shadow NIC teaming device when the I/O thread is done with its current iteration with the primary NIC teaming device, wherein the shadow NIC teaming device is configured to handle the packets of the I/O threads in the future iterations;
delete the primary NIC teaming device and designate the shadow NIC teaming device as the new primary NIC teaming device when all of the I/O threads are done with their current iteration with the primary NIC teaming device.

16. The at least one non-transitory computer-readable storage medium of claim 15, wherein the computer-executable instructions further cause the at least one processor to:
present the plurality of physical I/O devices as one virtual I/O device to the plurality of I/O threads of applications running on the host;
receive, process, and transmit packets from the I/O threads via the primary NIC teaming device and/or the shadow NIC teaming device through a plurality of iterations.

17. The at least one non-transitory computer-readable storage medium of claim 15, wherein the computer-executable instructions further cause the at least one processor to map the shadow NIC teaming device to a plurality of physical I/O devices coupled to a plurality of external physical NICs that are not identical to the physical I/O devices of the primary NIC teaming device.

18. The at least one non-transitory computer-readable storage medium of claim 15, wherein the computer-executable instructions further cause the at least one processor to direct the future iterations of the I/O thread to the shadow NIC teaming device via an atomic operation by swapping pointer to the NIC teaming device from the primary NIC teaming device to the shadow NIC teaming device.

19. The at least one non-transitory computer-readable storage medium of claim 15, wherein the computer-executable instructions further cause the at least one processor to allow each of the I/O threads is configured to access one of the primary NIC teaming device and the shadow NIC teaming device, but not both, at any time.

20. The at least one non-transitory computer-readable storage medium of claim 15, wherein the computer-executable instructions clause the at least one processor to delete the shadow NIC teaming device and direct all of the I/O threads to continue to use the primary NIC teaming device if NIC teaming configuration rollback is required due to a failure.

* * * * *